(12) United States Patent
Asuncion et al.

(10) Patent No.: US 10,730,990 B2
(45) Date of Patent: Aug. 4, 2020

(54) GRAPHENE OXIDE MODIFIED THERMOSET MONOMER AND SYNTHESIS THEREOF

(71) Applicant: Continental Structural Plastics, Inc., Auburn Hills, MI (US)

(72) Inventors: Michael Z. Asuncion, Auburn Hills, MI (US); Probir Kumar Guha, Bloomfield Hills, MI (US); David J. Krug, Auburn Hills, MI (US); Michael J. Siwajek, Rochester Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 77 days.

(21) Appl. No.: 16/068,530

(22) PCT Filed: Jan. 24, 2017

(86) PCT No.: PCT/US2017/014759
§ 371 (c)(1),
(2) Date: Jul. 6, 2018

(87) PCT Pub. No.: WO2017/132156
PCT Pub. Date: Aug. 3, 2017

(65) Prior Publication Data
US 2019/0031808 A1    Jan. 31, 2019

Related U.S. Application Data

(60) Provisional application No. 62/287,351, filed on Jan. 26, 2016.

(51) Int. Cl.
| | |
|---|---|
| *C08F 283/00* | (2006.01) |
| *C01B 32/194* | (2017.01) |
| *C07F 1/10* | (2006.01) |
| *C08G 18/83* | (2006.01) |
| *C08K 3/04* | (2006.01) |
| *C08K 9/04* | (2006.01) |
| *C07F 1/00* | (2006.01) |

(52) U.S. Cl.
CPC ........ *C08F 283/006* (2013.01); *C01B 32/194* (2017.08); *C07F 1/00* (2013.01); *C07F 1/10* (2013.01); *C08F 283/00* (2013.01); *C08G 18/83* (2013.01); *C08K 9/04* (2013.01); *C08K 3/042* (2017.05)

(58) Field of Classification Search
CPC ........ C08F 283/00; C01B 32/194; C07F 1/10; C08K 3/04; C08K 9/04; C08G 18/83
See application file for complete search history.

(56) References Cited

U.S. PATENT DOCUMENTS

| | | |
|---|---|---|
| 4,260,358 A | 4/1981 | Mehnert |
| 4,643,126 A | 2/1987 | Wilkinson et al. |
| 5,100,935 A | 3/1992 | Iseler et al. |
| 5,268,400 A | 12/1993 | Iseler et al. |
| 5,854,317 A | 12/1998 | Rinz |
| 6,723,486 B2 | 4/2004 | Goodall et al. |
| 6,780,923 B2 | 8/2004 | Guha et al. |
| 7,829,637 B2 | 11/2010 | Guha et al. |

FOREIGN PATENT DOCUMENTS

| | | |
|---|---|---|
| CN | 104374815 A | 2/2015 |
| EP | 2402395 A2 | 1/2012 |
| KR | 101489174 B1 | 2/2015 |

OTHER PUBLICATIONS

Mariconda et al., "Synthesis of ruthenium catalysts functionalized graphene oxide for self-healing applications" Polymer 2015, pp. 1-13.*
Liu et al., "One-pot preparation of unsaturated polyester nanocomposites containing functionalized graphene sheets via a novel solvent-exchange method." RSC Advances, 2013, pp. 22380-22388 vol. 2.*
Zhang et al., "Covalent modification of graphene oxide with polybornene by surface-iniitiated ring-opening metathesis polymerization" Polymer 2014, vol. 44, Issue 23, pp. 6044-6050.*
Guss, C.O., "The Reaction of Styrene Oxide with Phenol", Journal of the American Chemical Society, Oct. 1949, pp. 3460-3462, vol. 71, Issue 10.
Nicholas, K.M., "A Protecting Group for the Carbon-Carbon Double Bond", Journal of the American Chemical Society, May 28, 1975, pp. 3254-3255, vol. 97, Issue 11.
Liu, C. et al., "One-pot preparation of unsaturated polyester nanocomposites containing functionalized graphene sheets via a novel solvent-exchange method", RSC Advances, 2013, pp. 22380-22388, vol. 3, © The Royal Society of Chemistry 2013; DOI: 10.1039/c3ra42549e.
Swain, S., "Synthesis and Characterization of Graphene Based Unsaturated Polyester Resin Composites", Transactions on Electrical and Electronic Materials, Apr. 25, 2013, pp. 53-58, vol. 14, Issue 2, © 2013 KIEMME; DOI: 10.4313/TEEM.2013.14.2.53.
Zhang, Q. et al., "Covalent modification of graphene oxide with polynorbornene by surface-initiated ring-opening metathesis polymerization", Polymer, Available Online: Sep. 28, 2014, pp. 6044-6050, vol. 55, Issue 23, © 2014 Elsevier Ltd.; DOI: 10.1016/j.polymer.2014.09.049.
Qi, J.Y. et al., "Conductive Properties of Ag-graphene modificated unsaturated polyester resin", Thermosetting Resin, 2015, pp. 17-20, Abstract, vol. 3.
Mariconda, A. et al., "Synthesis of ruthenium catalysts functionalized graphene oxide for self-healing applications", Polymer, 2015, pp. 1-13, © 2015 Elsevier Ltd.; DOI: 10.1016/j.polymer.2015.04.048.
International Search Report dated May 1, 2017 for International Application No. PCT/US2017/014759 filed Jan. 24, 2017.

* cited by examiner

*Primary Examiner* — Robert D Harlan
(74) *Attorney, Agent, or Firm* — Blue Filament Law PLLC

(57) ABSTRACT

A monomer is provided for a thermoset molding compound. The monomer is also polymerized with conventional monomers to form thermoplastic polymers. Graphene oxide is used to chelate metal ions to form a graphene oxide chelate that is coupled to a monomer retaining an aliphatic unsaturation capable of free radical polymerization reaction. Inclusion of a metal ion chelated to the graphene oxide affords control over the conductivity of the resultant article. In some embodiments, the monomer is found polymerized into a resulting article proximal to the article surface.

17 Claims, No Drawings

GRAPHENE OXIDE MODIFIED THERMOSET MONOMER AND SYNTHESIS THEREOF

RELATED APPLICATIONS

This application claims priority benefit of U.S. Provisional Application Ser. No. 62/287,351 filed Jan. 26, 2016; the contents of which are hereby incorporated by reference.

FIELD OF THE INVENTION

The present invention in general relates to sheet molding compounds and in particular, to sheet molding compound with improved surface conductivity.

BACKGROUND OF THE INVENTION

Sheet molding compounds (SMC) are a paste reinforced with glass, carbon, or natural fibers. The paste is generally a polyester resin filled with calcium carbonate and other additives. While fibers are initially randomly oriented in the plane of the sheets, forming processes such as compression molding or extrusion causes orientation of the fibers and a surface skin with few fibers exposed. Due to both their specific mechanical and electrical properties and their cost-efficient processing, these materials are widely used by the automotive industry and by the electrical industry to produce rigid and lightweight parts. The resulting parts are characterized by surfaces that are not electrical conductive and prone to surface energy inhomogeneities that make it difficult to obtain the high gloss surface needed for many vehicle applications.

Graphene is processed by chemical exfoliation to yield graphene oxide. Graphene oxide has a variety of reactive moieties including hydroxyl, epoxy and carboxyl groups. The sheet-like structure of graphene oxide and the conjugated ring structure make this attractive as an additive to modify the surface properties of SMCs. Unfortunately, for all the potential properties of graphene oxide, the conductivity and surface energies that would result from a sub-monolayer surface layer of graphene oxide are inadequate to meet production needs for mass production of parts. Additionally, compatibility of graphene oxide with high-density inorganic fillers, such as calcium carbonate, carbon fibers, and thermoplastic low profile additives present to improve the surface remain a challenge while attempting to improve processing while maintaining surface quality characteristics.

While attempts have been made to modify resin backbones to include graphene oxide, such efforts have met with limited success owing to complications in maintaining properties of existing, qualified resins. Additionally, owing to viscosity and molecular weight of thermoset resin prepolymers, appreciable amounts of graphene oxide are required to fill the matrix volume with graphene oxide, even though such properties are often preferentially desired at the surface of a molded article.

Thus, there exists a need for a monomer containing a modified graphene oxide for improved surface conductivity in SMC or BMC article molding.

SUMMARY OF THE INVENTION

A cross-linkable monomer is provided having a free radical curable ethylenic unsaturation covalently bonded to graphene oxide, the graphene oxide bonded to a metal ion. The cross-linkable monomer having the formula:

$$X\text{—}(O\text{-}G\text{-}M_nY)CH_2OH \text{ or } X\text{—}O\text{-}G\text{-}M_nY \qquad (I)$$

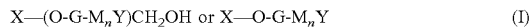

where X is $CH_2$=$CH$—Ar—CH, $CH_2$=$CH$—Ar—CH(OH)$CH_2$, $CH_2$=$CH$—$CHRCH_2$ or norborene-C(O); Ar is phenyl, or a phenyl having a substituent; R is $C_1$-$C_{10}$ alkyl, or hydroxyl; G is graphene oxide containing at least one carboxyl group and one hydroxyl group; M in each occurrence is independently a metal ion having a coordination number and selected from the group of silver, copper, iron, zinc, iron, or magnesium; n is an integer value of between 1 and 10, and Y is either a nullity or a chelating agent that in combination with the graphene oxide satisfies the coordination number of the metal ion, where the substituent is $C_1$-$C_{10}$ alkyl, $C_1$-$C_{10}$ alkyl hydroxyl, $C_1$-$C_{10}$ alkyl sulfonyl, or $C_1$-$C_{10}$ alkyl amine.

A molding composition formulation includes a thermoset cross-linkable polymeric resin, a cross-linkable monomer, and a free radical polymerization catalyst to cure the resin and the monomer to form an article.

DETAILED DESCRIPTION OF THE INVENTION

The present invention has utility as a monomer for a thermoset molding compound. It is appreciated that the monomer is also polymerized with conventional monomers to form novel thermoplastic polymers. According to the present invention, graphene oxide is used to chelate metal ions to form a graphene oxide chelate that is coupled to a monomer retaining an aliphatic unsaturation capable of free radical polymerization reaction. It has been found that the inclusion of a metal ion chelated to the graphene oxide affords control over the conductivity of the resultant article. In some embodiments, the monomer is found polymerized into a resulting article proximal to the article surface.

The present invention includes a cross-linkable monomer having the formula:

$$X\text{—}(O\text{-}G\text{-}M_nY)CH_2OH \text{ or } X\text{—}O\text{-}G\text{-}M_nY \qquad (I)$$

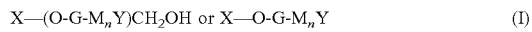

where X is $CH_2$=$CH$—Ar—CH, $CH_2$=$CH$—Ar—CH(OH)$CH_2$, $CH_2$=$CH$—$CHRCH_2$ or norborene-C(O); Ar is phenyl, or a phenyl having a substituent; R is $C_1$-$C_{10}$ alkyl, or hydroxyl; G is graphene oxide containing at least one carboxyl group and one hydroxyl group; M in each occurrence is independently a metal ion having a coordination number and selected from the group of silver, copper, iron, zinc, iron, or magnesium; n is an integer value of between 1 and 10, and Y is either a nullity or a chelating agent that in combination with the graphene oxide satisfies the coordination number of the metal ion, where the substituent is $C_1$-$C_{10}$ alkyl, $C_1$-$C_{10}$ alkyl hydroxyl, $C_1$-$C_{10}$ alkyl sulfonyl, or $C_1$-$C_{10}$ alkyl amine. The metal ion in certain inventive embodiments is only silver.

The chelating agent Y is provided in certain inventive embodiments to inhibit simultaneous chelation of a single metal ion by chelating moiety, such as carboxyl groups by multiple graphene oxide molecules. It is appreciated that some preparations of graphene oxide are able to chelate a given metal ion and a given loading without resort to an additional chelating agent and as a result, Y is the above formula is not necessary and would be a nullity in the above formula. The chelating agent Y, when present is mondentate, bidentate, or polydentate. Without intending to be bound to a particular theory, stearic effects associated with the separation between carboxyl groups on the graphene oxide molecule make it difficult to complete the coordination number for a given metal ion, leading to solvent coordination or chelation by carboxyl groups of other graphene oxide molecules; resulting is low stability chelation and increased viscosity, respectively. A chelating agent Y is provided to displace coordinate covalent bonds with solvent or multiple graphene oxide molecules as needed. As subsequently detailed, titration with a chelating agent is readily accomplished to end points that illustratively include a decrease in viscosity, a color change, or a combination thereof.

A chelating agent Y operative herein illustratively includes alkyleneamine acids, such as ethylenediamine di succinic acid (EDDS), ethylenediamine dimalonic acid (EDDM), and ethylenediamine diglutaric acid (EDDG), ethylendiaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenediamine (Then), triaminotriethylene amine, citric acid, pyridine, pyrrole, and propylenediamine.

Graphene oxide, G is commercially available or a prepared process such as chemical exfoliation of graphite with mineral acid and permanganate. The resultant suspension is washed and filtered to remove residual graphite and oxidizing agents. The resulting graphene oxide is dried to a flowable powder.

The graphene oxide chelating at least one metal ion, includes at least one reactive hydroxyl group and has the general formula:

$$HO\text{-}G\text{-}M_nY \qquad (II)$$

This molecule is readily coupled to molecules so as to retain the ability to undergo conventional polymerization reactions. The present invention is detailed with respect to a divinylbenzene to afford a molecule that undergoes polymerization reactions under conditions common to styrene polymerization, yet is covalently bonded a graphene oxide molecule functioning as a metal chelator. The cis-, meta-, and trans-isomers of divinylbenzene are all operative herein, each alone or a mixture of isomers. It is appreciated that monomer analogues are also produced as to other vinyl group containing molecules. These monomers that are mimicked by coupling to (II), illustratively include vinyl esters, and vinyl chloride.

An exemplary chemistry for covalently bonding (II) to divinylbenzene includes reaction with Ph-C(O)O—OH in methylene chloride at 0 degrees Celsius to convert one of the two vinyl groups of divinylbenzene to an epoxide. This reaction is commonly known as a Prilezhaev reaction. In some inventive embodiments, the second vinyl group is protected with $C_5H_5Fe$—$(CO)_2$+ by the procedure detailed in K. M. Nicholas, J. Am. Chem. Soc., 1975, 97 (11), pp 3254-3255.

Epoxide coupling to (II) is readily accomplished by a variety of reaction paths including the direct coupling as detailed in C. O. Guss, J. Am. Chem. Soc., 1949, 71 (10), pp 3460-3462 to obtain (I).

A substituted divinylbenzene in which one or more of the phenyl hydrogen atoms is replaced with a functionality is operative herein and is advantageous in instances where there is a need to modify the hydrophilicity of the molecule, aid purification (I) or (II), or to provide additional coupling moieties.

In still other embodiments of the present invention, 2-norbornene-5-carboxylic acid (bicyclo[2.2.1]hept-5-ene-2-carboxylic acid) is prepared by the Diels-Alder reaction of cyclopentadiene with acrylic acid in accordance with the following reaction scheme as detailed in U.S. Pat. No. 6,723,486:

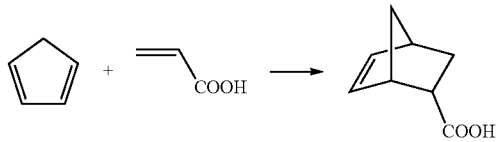

2-norbornene-5-carboxylic acid then reacted with (II) in the presence of acid catalyst such as sulfuric acid or dry HCl to form an ester between the 2-norborene and the alcohol group of metalized graphene oxide.

A principal component of an SMC or BMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites. Typical SMC and BMC formulations are described in U.S. Pat. Nos. 4,260,358; 4,643,126; 5,100,935; 5,268,400; 5,854,317 and 6,780,923; and 7,829,637.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. The resulting compound (I) is such a monomer, and is often mixed with cross-linkable polymer resin in addition to, or in lieu of conventional ethylenically unsaturated monomer such as styrene. A typical ratio for compound (I) to styrene used in SMC or BMC formulation is between 0.000001-0.11:1. The monomer inclusive of (I) provides benefits including lower prepolymer viscosity and thermosetting without formation of a volatile byproduct while imparting a degree of surface conductivity. Without intending to be bound to a particular theory, the compound (I) tends to segregate to the formulation interface prior to polymerization and as a result the surface becomes rich in graphene oxide and the associated chelated metal ions.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The inventive molding formulation inclusive of compound (I) in certain embodiments includes a particulate filler. Particulate fillers operative in such molding compositions illustratively include calcium carbonate, calcium silicate, alumina, ATH, silica, talcs, dolomite, vermiculite, diatomaceous earth, kaolin clay, graphite, metal, hollow glass microspheres, polymeric microspheres, and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent of the molding composition total weight. Typical filler sizes are from 0.1 to 50 microns.

A fiber filler is typically added to provide strength relative to a particulate filler. Fiber fillers operative herein illustratively include glass, carbon, polyimides, polyesters, polyamides, and natural fibers such as cotton, silk, and hemp, and combinations thereof. Chopped glass fibers alone, carbon fibers, or combinations thereof are provided in lengths typically ranging from 5 to 50 millimeters. Fiber fillers are typically present from 0 to 80 total weight percent.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent.

It is appreciated that a particularly advantageous lightweight article is formed through inclusion of carbon fiber and hollow glass microspheres with the inventive compound (I) to achieve both weight reduction and amenable to electrostatic surface coating. In still other embodiments, the resultant articles have the surface gloss and finish required for automotive body panels. This surface finish is commonly referred to a class "A" finish.

It is appreciated that the present invention optionally also incorporates additional additives illustratively including flame retardants, plasticizers, colorants, and other processing additives conventional to the art.

The present invention is particularly well suited for the production of a variety of products illustratively including bumper beams, vehicle door panel components, automotive floor components, spoilers, hoods, deck lids, body panels, and various industrial and consumer product housings such as cabinets, lockers, and pallets.

The present invention is further illustrated with respect to the following non-limiting examples:

Example 1

5 mmol of p-divinylbenzene is dissolved in 20 ml of methylene chloride under nitrogen and cooled to zero degrees Celsius with an ice bath. An equimolar amount of PhC(O)O—OH is added and the mixture stirred for 12 hours. 4-vinylstyryl oxide is isolated and purified. 4-vinylstyryl oxide is added at 0.1 mol in refluxing water with graphene oxide (0.3 mol) with 0.1 mol NaOH according to C. O. Guss, J. Am. Chem. Soc., 1949, 71 (10), pp 3460-3462. A mixture of $CH_2$=CH-Ph-CH—(O-G-((COOH)$_n$) and $CH_2$=CH-Ph-CH(OH)CH$_2$—O-G-(COOH)$_n$ are obtained.

The $CH_2$=CH-Ph-CH—(O-G-((COOH)$_n$) and $CH_2$=CH-Ph-CH(OH)CH$_2$—O-G-(COOH)$_n$ mixture from above is combined into a base thermoset resin of TCA® Ultra Lite™ Continental Structural Plastics (Auburn Hills, Mich., USA) at a 0.5 total weight percent and cured. The resulting formulation is cured into a plaque having a surface rich in graphene oxide and greater surface conductivity than a plaque formed from the base thermoset resin alone.

Example 2

The graphene oxide reaction with an epoxide procedure of Example 1 is repeated with graphene oxide chelated with an equimolar amount of Ag+. The resulting plaque has greater surface conductivity than the plaques of Example 1.

Example 3

The graphene oxide reaction with an epoxide procedure of Example 2 is repeated with 2-vinyloxirane in place of 4-vinylstyryl oxide to obtain a comparable plaque to that of Example 2 at the same 0.5 total weight percent.

Example 4

2-norbornene-5-carboxylic acid is combined in equimolar amount (0.1 mol, each) in water with dropwise added sulfuric acid and stirred for 1 hour to form an ester of 2-norborene with graphene oxide —Ag+. The resulting compound is combined into the base thermoset resin of TCA® Ultra Lite™ at a 0.5 total weight percent and cured to obtain a plaque comparable to that of Example 2.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A cross-linkable monomer having a free radical curable ethylenic unsaturation covalently bonded to graphene oxide, the graphene oxide bonded to a metal ion.

2. The cross-linkable monomer of claim 1 having the formula:

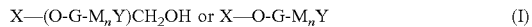
X—(O-G-M$_n$Y)CH$_2$OH or X—O-G-M$_n$Y  (I)

where X is CH$_2$=CH—Ar—CH, CH$_2$=CH—Ar—CH(OH)CH$_2$, CH$_2$=CH—CHRCH$_2$ or norbornene-C(O); Ar is phenyl, or a phenyl having a substituent; R is C$_1$-C$_{10}$ alkyl, or hydroxyl; G is graphene oxide containing at least one carboxyl group and one hydroxyl group; M in each occurrence is independently a metal ion having a coordination number and selected from the group of silver, copper, iron, zinc, iron, or magnesium; n is an integer value of between 1 and 10, and Y is either a nullity or a chelating agent that in combination with the graphene oxide satisfies the coordination number of the metal ion, where the substituent is C$_1$-C$_{10}$ alkyl, C$_1$-C$_{10}$ alkyl hydroxyl, C$_1$-C$_{10}$ alkyl sulfonyl, or C$_1$-C$_{10}$ alkyl amine.

3. The monomer of claim 2 wherein Y is a nullity.

4. The monomer of claim 2 wherein Y is ethylenediaminetetraacetate.

5. The monomer of claim 2 where X is a mixture of CH$_2$=CH—Ar—CH and CH$_2$=CH—Ar—CH(OH)CH$_2$.

6. The monomer of claim 2 where X is norbornene-C(O).

7. A molding composition formulation comprising:
a thermoset cross-linkable polymeric resin; and
the cross-linkable monomer of claim 1; and
a free radical polymerization catalyst to cure said resin and said monomer to form an article.

8. The formulation of claim 7 further comprising styrene.

9. The formulation of claim 8 wherein said cross-linkable monomer is present in a ratio relative to said styrene of 0.00001-0.1:1.

10. The formulation of claim 7 further comprising a fiber filler of glass, carbon, natural, or a combination thereof.

11. The formulation of claim 7 further comprising a low profile additive.

12. The formulation of claim 7 further comprising hollow microspheroids.

13. The formulation of claim 7 further comprising filler particles.

14. The formulation of claim 7 wherein said resin is a polyester.

15. The formulation of claim 7 wherein said resin is an epoxy or a polyurethane.

16. The formulation of claim 7 wherein said article is one of a vehicle bumper beam, vehicle door panel component, automotive floor component, vehicle spoiler, a vehicle hood, a spoiler, a hood, a deck lid, or a body panel.

17. The monomer of claim 2 wherein M is only silver.

* * * * *